(12) United States Patent
La Fever et al.

(10) Patent No.: US 8,700,957 B2
(45) Date of Patent: Apr. 15, 2014

(54) SYSTEMS AND METHODS OF IMPLEMENTING CONTENT VALIDATION OF MICROCOMPUTER BASED CIRCUITS

(75) Inventors: George Bernard La Fever, Huntsville, AL (US); Iser B. Flaum, Fullerton, CA (US)

(73) Assignee: Electronic Warfare Associates, Inc., Herndon, VA (US)

( * ) Notice: Subject to any disclaimer, the term of this patent is extended or adjusted under 35 U.S.C. 154(b) by 0 days.

(21) Appl. No.: 13/454,165

(22) Filed: Apr. 24, 2012

(65) Prior Publication Data

US 2012/0331348 A1 Dec. 27, 2012

Related U.S. Application Data

(60) Provisional application No. 61/484,587, filed on May 10, 2011.

(51) Int. Cl.
*G06F 11/00* (2006.01)

(52) U.S. Cl.
USPC .............................................. 714/30; 714/46

(58) Field of Classification Search
USPC ..................................................... 714/30, 46
See application file for complete search history.

(56) References Cited

U.S. PATENT DOCUMENTS

| | | | |
|---|---|---|---|
| 5,070,448 A | 12/1991 | Crandall | |
| 5,325,368 A | 6/1994 | James | |
| 5,488,688 A | 1/1996 | Gonzales | |
| 5,621,651 A | 4/1997 | Swooba | |
| 5,706,297 A * | 1/1998 | Jeppesen et al. | 714/30 |
| 6,134,652 A * | 10/2000 | Warren | 712/227 |
| 6,314,530 B1 * | 11/2001 | Mann | 714/38.11 |
| 6,393,591 B1 | 5/2002 | Jenkins, IV et al. | |
| 6,578,167 B2 | 6/2003 | Boorom et al. | |
| 6,721,687 B2 | 4/2004 | Bartolome et al. | |
| 6,766,305 B1 | 7/2004 | Fucarile et al. | |
| 6,842,865 B2 | 1/2005 | Nee | |
| 6,931,572 B1 * | 8/2005 | Schubert et al. | 714/34 |
| 7,017,081 B2 | 3/2006 | Gomez | |
| 7,089,467 B2 | 8/2006 | Burch | |
| 7,095,718 B1 | 8/2006 | Terry | |
| 7,203,842 B2 | 4/2007 | Kean | |
| 7,215,580 B2 | 5/2007 | Gorobets | |
| 7,237,161 B2 | 6/2007 | Volz | |
| 7,249,172 B2 | 7/2007 | Ollive et al. | |
| 7,287,190 B2 | 10/2007 | Rosenman et al. | |
| 7,366,955 B2 | 4/2008 | Kuturianu et al. | |
| 7,376,917 B1 | 5/2008 | Lazarut et al. | |

(Continued)

FOREIGN PATENT DOCUMENTS

EP 0 819 052 8/2001

OTHER PUBLICATIONS

International Search Report issued in PCT/US2009/068666 on Aug. 17, 2010.
Written Opinion issued in PCT/US2009/068666 on Aug. 17, 2010.

(Continued)

*Primary Examiner* — Joshua Lohn
(74) *Attorney, Agent, or Firm* — DLA Piper LLP (US)

(57) ABSTRACT

Systems and methods for remotely performing testing or scanning of boards, devices and/or systems across a network to validate code stored in the subject circuits, including validation of non-volatile storage such as Flash memory and volatile storage such as RAM, containing stable content of known patterns.

53 Claims, 11 Drawing Sheets

(56) References Cited

U.S. PATENT DOCUMENTS

| | | |
|---|---|---|
| 7,429,915 B2 | 9/2008 | Cruzado |
| 7,463,652 B2 | 12/2008 | Karol |
| 7,526,679 B2 | 4/2009 | So |
| 7,539,900 B1 | 5/2009 | Plofsky |
| 7,543,275 B2 | 6/2009 | Kuturianu et al. |
| 7,558,966 B2 | 7/2009 | Durham |
| 7,739,517 B2 | 6/2010 | Sahita |
| 7,801,050 B2 | 9/2010 | Mitra |
| 7,817,484 B2 | 10/2010 | Demone |
| 2002/0138801 A1 | 9/2002 | Wang |
| 2003/0041286 A1 | 2/2003 | Beerom |
| 2003/0101042 A1 | 5/2003 | Ollive |
| 2003/0140291 A1* | 7/2003 | Brown et al. ............... 714/724 |
| 2003/0217306 A1 | 11/2003 | Harthcock |
| 2004/0064764 A1 | 4/2004 | Gomex |
| 2004/0158784 A1 | 8/2004 | Abuhamdeh |
| 2004/0216061 A1* | 10/2004 | Floyd et al. ............... 716/4 |
| 2004/0250150 A1 | 12/2004 | Swoboda |
| 2005/0216895 A1 | 9/2005 | Tran |
| 2005/0262465 A1 | 11/2005 | Goyal |
| 2005/0281343 A1* | 12/2005 | Hsu et al. ............... 375/257 |
| 2006/0059387 A1* | 3/2006 | Swoboda et al. ............... 714/30 |
| 2006/0136751 A1 | 6/2006 | Bonaccio |
| 2006/0200718 A1 | 9/2006 | Halliday |
| 2006/0242499 A1 | 10/2006 | Volz |
| 2007/0001528 A1 | 1/2007 | Umegaki et al. |
| 2007/0052809 A1 | 3/2007 | Hammadou |
| 2007/0291906 A1 | 12/2007 | Halliday et al. |
| 2008/0034334 A1 | 2/2008 | Laouamri |
| 2008/0098380 A1 | 4/2008 | Klusmeyer |
| 2008/0137543 A1 | 6/2008 | Mitra |
| 2009/0070887 A1* | 3/2009 | Knowles et al. ............... 726/34 |
| 2009/0177830 A1* | 7/2009 | Orion et al. ............... 710/267 |
| 2009/0177930 A1 | 7/2009 | Orion |
| 2009/0210763 A1* | 8/2009 | Eckelman et al. ............... 714/731 |
| 2009/0307546 A1* | 12/2009 | Dunn et al. ............... 714/726 |
| 2010/0174955 A1 | 7/2010 | Carnevale |
| 2010/0180169 A1* | 7/2010 | La Fever et al. ............... 714/727 |
| 2010/0281318 A1 | 11/2010 | Redondo |

OTHER PUBLICATIONS

International Search Report issued in PCT/US2012/034735.
Written Opinion issued in PCT/US2012/034735.
U.S. Appl. No. 12/641,627.
Supplementary European Search Report issued in EP 09838570.1 on Mar. 15, 2013.
U.S. Appl. No. 13/661,596.
U.S. Appl. No. 13/605,888.

* cited by examiner

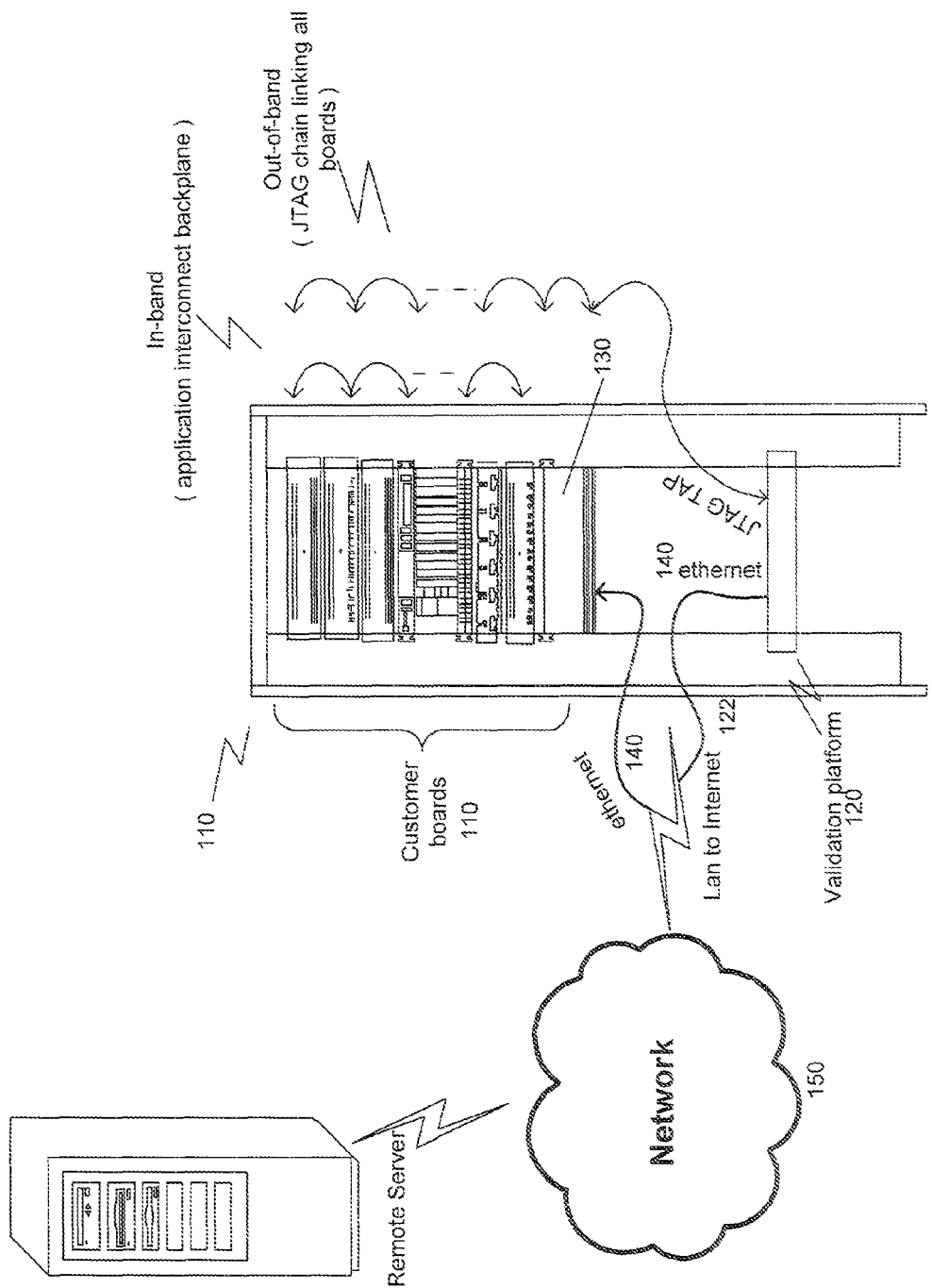
Figure 1 - Basic Validation Installation Hookup

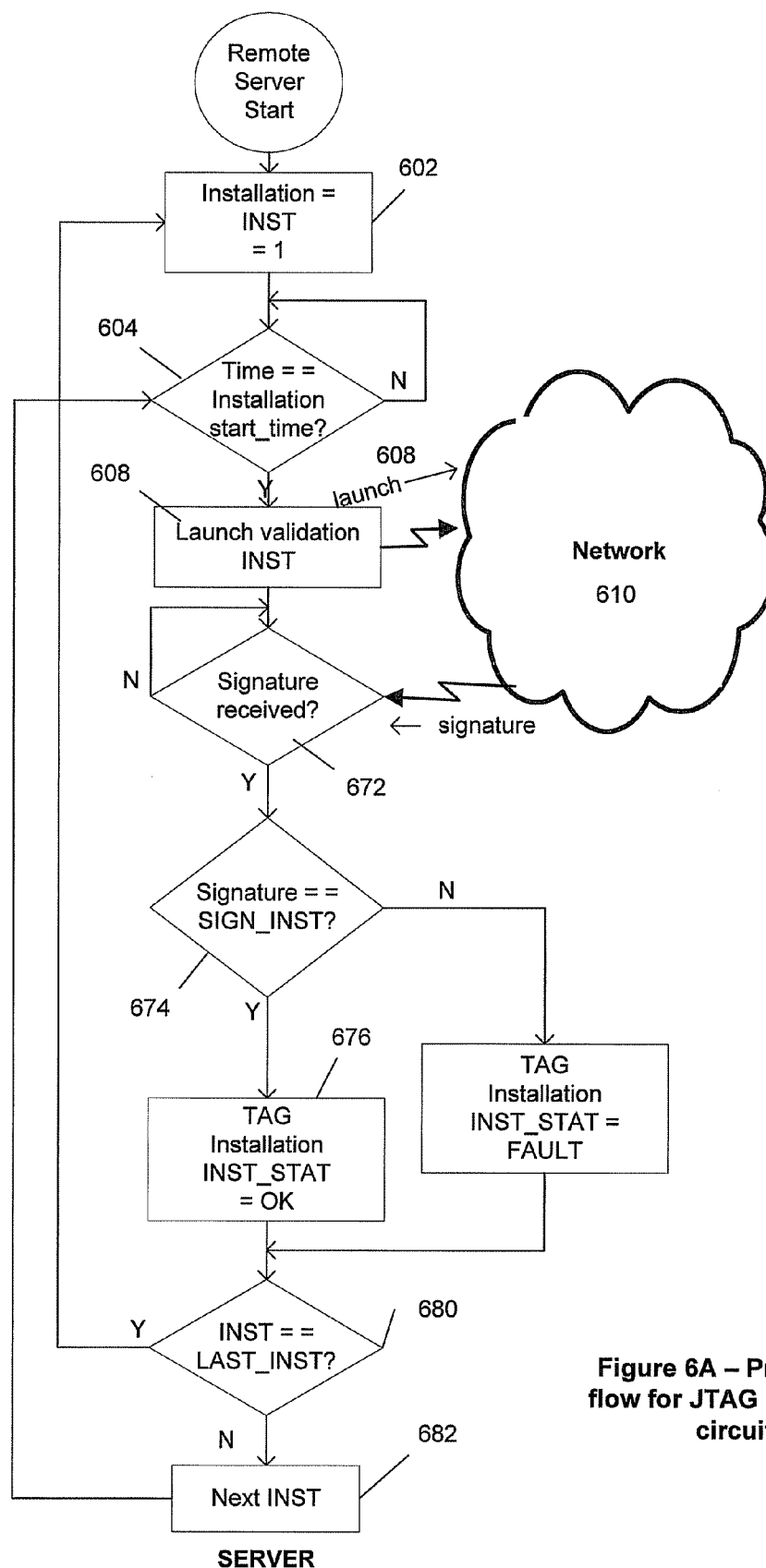
Figure 6A – Processing flow for JTAG diagnostic circuits

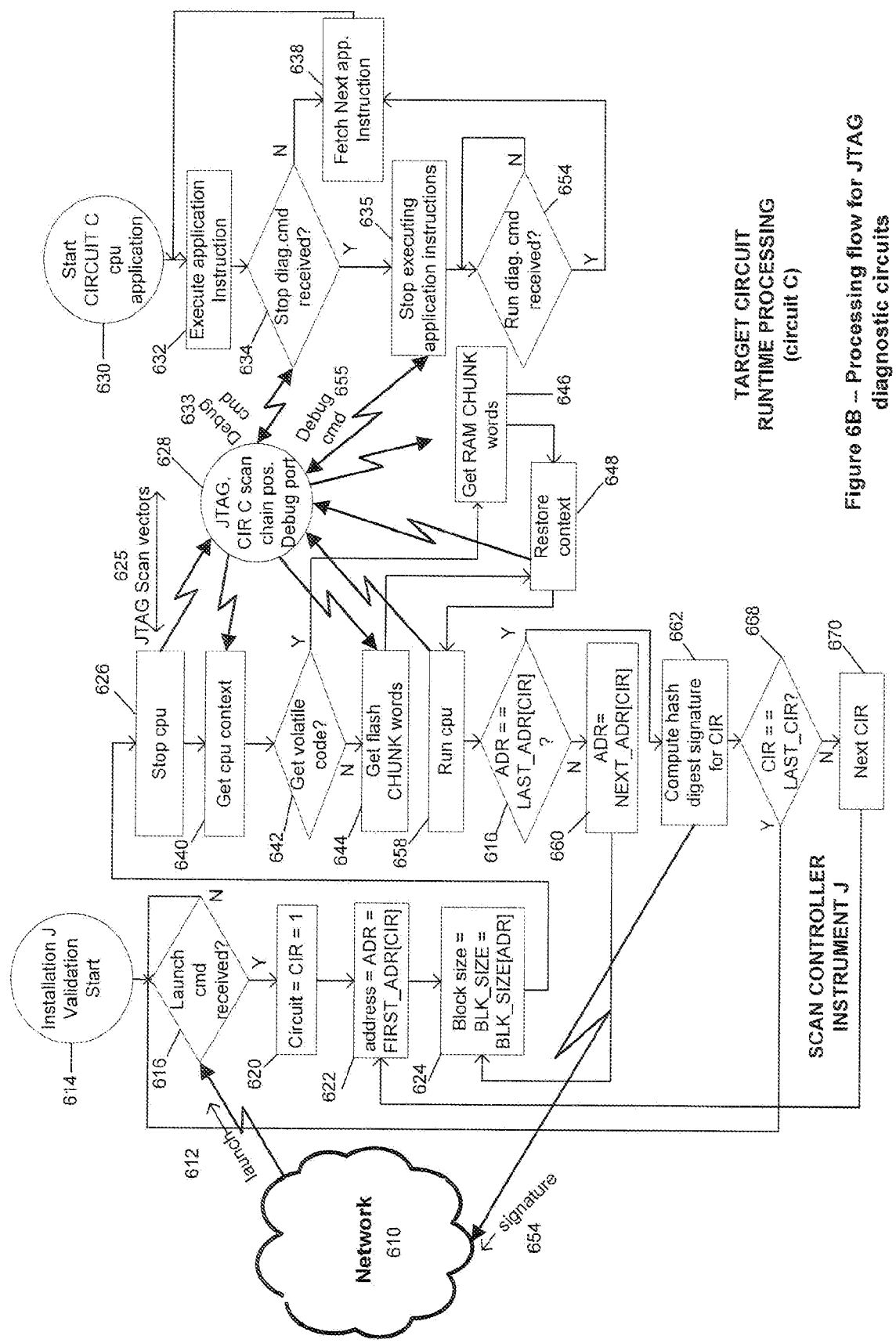
Figure 6B – Processing flow for JTAG diagnostic circuits

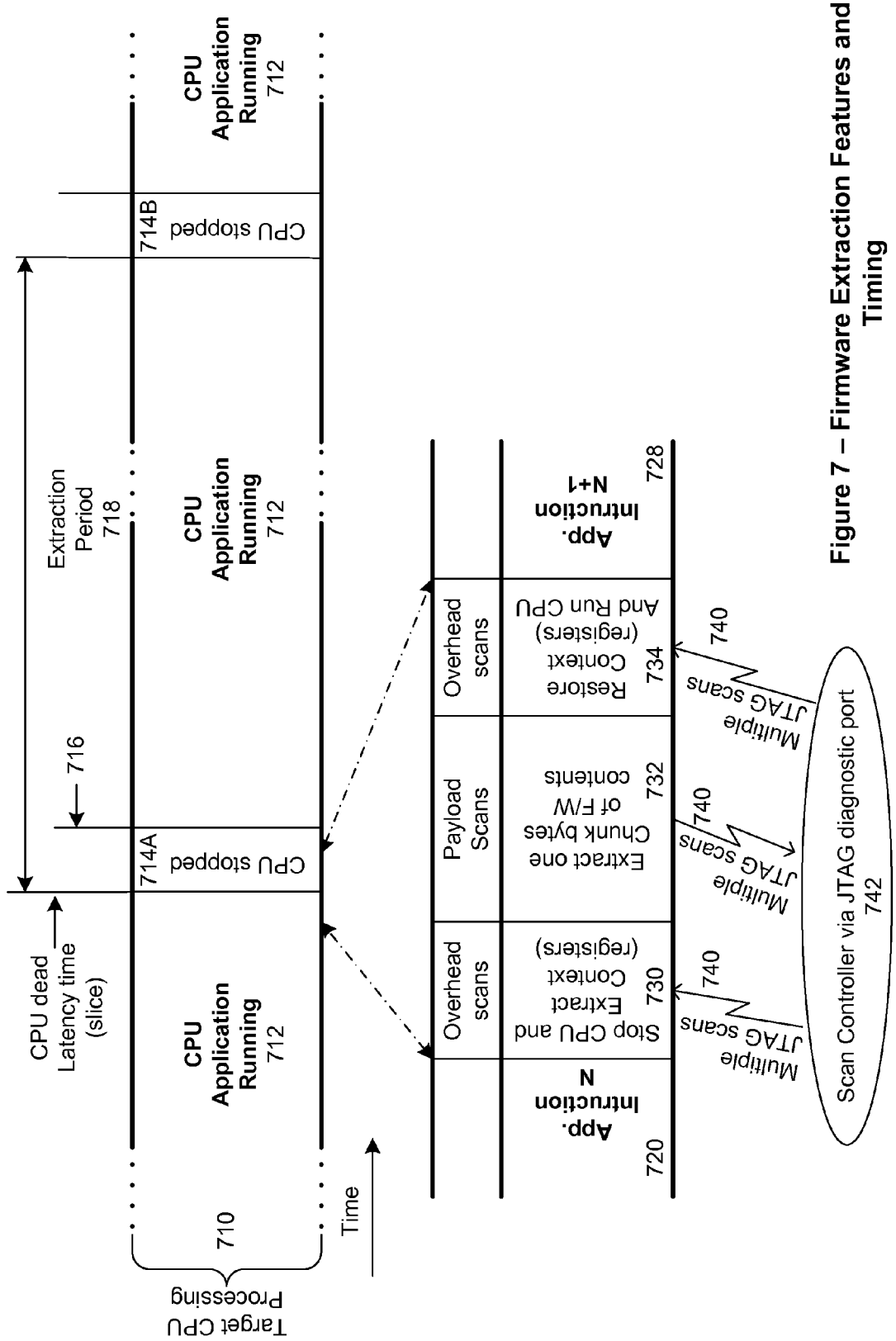
Figure 7 – Firmware Extraction Features and Timing

SYSTEMS AND METHODS OF IMPLEMENTING CONTENT VALIDATION OF MICROCOMPUTER BASED CIRCUITS

CROSS-REFERENCE TO RELATED APPLICATIONS

This application is based on and derives the benefit of the filing date of U.S. Provisional Patent Application No. 61/484,587, filed May 10, 2011. The entire content of this application is herein incorporated by reference in its entirety.

FIELD

The present disclosure is directed to the field of verifying circuit operation and, more particularly, towards systems and methods of remotely validating circuitry including firmware of microcomputer based circuits.

BRIEF DESCRIPTION OF THE FIGURES

Reference is made to the attached drawings, wherein elements having the same reference designations represent like elements throughout and wherein:

FIG. 1 illustrates a basic system showing various components in an exemplary validation installation hookup according to one implementation.

FIG. 6 is a diagram illustrating exemplary scan processing at the server level, the instrument level, and the target level along with level interactions, according to certain implementations.

FIG. 7 is a schematic illustration showing exemplary firmware extraction and timing features, according to certain implementations.

DESCRIPTION OF EMBODIMENTS OF THE INVENTION

Figure 2A:
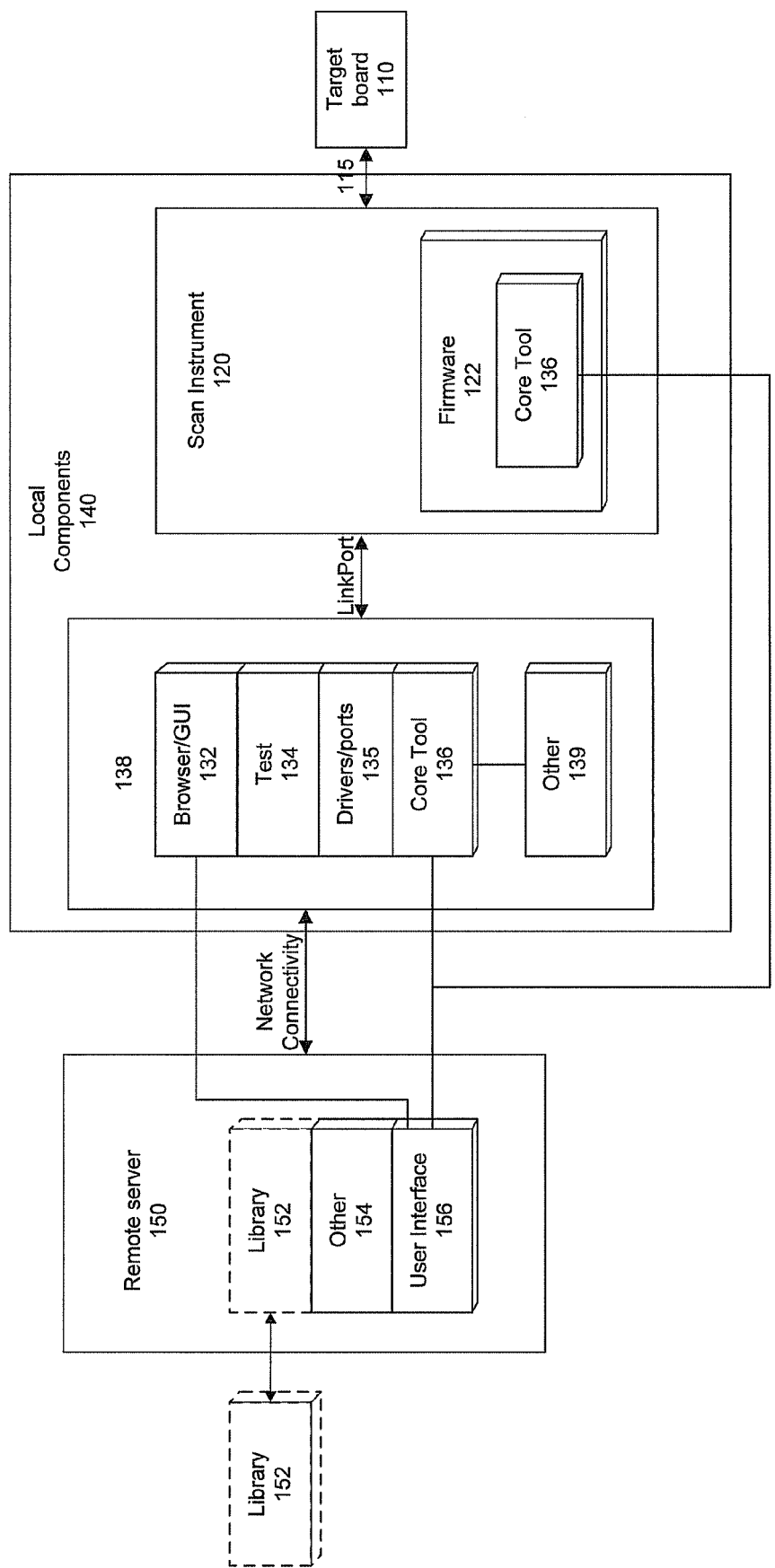
FIGS. 2A and 2B are block diagrams of a circuit scanning system and a scan instrument, respectively, according to certain implementations.

In the following, the term "microcomputer", "microcontroller", "processor", and/or "cpu" may be employed interchangeably. Further, the phrase "diagnostic port" or "debug port" may be used interchangeably referring to microcomputer interfaces which are dedicated to exposing special testability control access to internal operations, distinct from application interfaces and ports. Such ports will typically employ JTAG signaling protocols and signals for external interaction. The phrase "flash" or "flash memory" is interchangeable with any electronic device whose ordered binary content patterns can be electrically loaded for storage, and can be later retrieved even after having been unpowered.

This disclosure relates to validation of code stored in circuits and/or the circuits themselves. Circuits to be validated may comprise boards and/or an assembly of one or more boards, devices and/or systems. Systems and methods herein may facilitate secure confirmation that the binary patterns contained in such circuits are unaltered from their intended values, e.g., as installed at production or upgrade time. The present innovations may also include features of validating reduced signature values derived from the binary patterns, instead of or in addition to complete (original) binary patterns. As such, systems and methods herein may validate the memory content on a running target by various techniques, including comparing target extracted firmware data as a complete pattern of values against a known reference and/or comparing reduced signature values derived from the binary patterns against known signature reference(s). Further, systems and methods herein may compare one or both of such data types in the remote server (after uploading data or signature) and/or they may perform comparison(s) in the local scan controller, after downloading the reference from a remote location such as a server. Additionally, consistent with certain implementations, no special accommodations are needed in the tested circuits or any program content to support some embodiments of the validation features herein, beyond the provision of a debug port connection.

By means of some implementations, for example, a remote web server can automatically assure that no corruptions or deviations have crept into the code, either by stealth or by fault. Consistent with various aspects herein, variation(s) of such code, which could result in improper, deviant or unauthorized behavior of the containing circuits, may be detected. Moreover, innovations herein include methods of remotely performing periodic validation of such programmed content as a background task, enabling the detection and indication of any unexpected code alterations while the circuits continue performing their primary function(s).

Many of the embodiments used for illustration below relate to the remote validation of firmware code stored in non-volatile storage (e.g., Flash memory, etc.) of the circuits being tested. Such storage elements are presumed to have remained unchanged since being properly loaded or updated, and readily compared to their intended design content. However, embodiments relating to the validation of volatile storage (e.g., RAM, etc.) are also provided, consistent with aspects of the present invention. With regard to volatile storage, for example, validation may be achieved given stable conditions, such as content being known over certain time and/or address ranges. Such innovations may be utilized, inter alia, when the target CPU has transferred executable from FLASH to RAM and such sectors can be established as well-defined and unchanging for a while during the validation cycle.

In some embodiments, for example, the local microcomputer component transfers executable sectors from flash memory or other sources to RAM, which then may become the fetch reservoir for execution. Here, for example, information including executable instructions stored in volatile storage or RAM may be also validated when the sectors are characterized as having established states and remain wholly in the established states for the duration of the entire extraction sequence (covering one or more incremental steps). Such overall memory content would then be recognizable compared to expected patterns.

Further, in systems and methods that enable validation of codes placed into volatile storage, such codes may have originated from non-volatile storage, or they may have been constructed over time from various other sources such as externally downloaded elements, runtime generated parameters, etc. Provided that such patterns and storage locations are remotely known and are sufficiently stable over the duration of a complete validation cycle, they may be equivalently processed and authenticated consistent with the innovations herein.

Embodiments herein apply to circuits that include one or more microcomputers operated by execution of stored firmware code. Certain embodiments may further involve microcomputers having a debug test port, e.g., an EJTAG or COP (computer operation port) exposed with an electrically accessible connection. Here, these port(s) may support interaction with external equipment, while the circuit application program continues to run. In some implementations, for example, such debug ports provide visibility to the externally connected instrument of the stored firmware code in a benign manner. By use of such ports, embodiments herein may enable visibility and/or perform testing without substantially disrupting runtime operations underway, except for the momentary stopping of the application program execution. Debug ports of this type are frequently available in many commercial microcomputer devices. Some embodiments may also utilize additional instrument access to a network connection, such as the internet, to enable information exchanges with a remote site or server. Thus, for example, scan instruments herein may be configured to validate, via communication with the remote site or server, test information, to confirm desired system configuration or operation of the target.

In the context of embodiments herein, firmware may be defined as a type of software, including related data parameters, that is readable and executable as microcomputer instructions stored in one or more of a circuit's non-volatile storage devices. Such devices may be programmable, loaded with this firmware, and capable of retaining it even if the circuit becomes unpowered (i.e. non-volatile storage). These devices are usually loaded with the subject firmware information during fabrication or at a later update time by electrical means. They are susceptible to being physically replaced with other devices of similar construction containing altered content as a means of changing the circuit's programming. They are also susceptible to having alternate unauthorized code electrically loaded in place of the intended patterns. Typically, the content of this firmware fundamentally determines the behavioral characteristics of the overall circuit as manipulated by its microcomputer.

In other embodiments, firmware as used herein may also apply to code that is held for a time in volatile storage, such as RAM, originating either from non-volatile storage or other sources, whose content pattern remains sufficiently stable to be known, e.g., to a remote secure site.

FIG. 1 illustrates a basic system showing components of an exemplary validation installation hookup, according to certain implementations. The system illustrated in FIG. 1 comprises targets 110 such as circuit boards within components of a stack, a scan instrument 120, and a link or connection 122 to a network. These system elements may all be coupled to a network via a validation platform containing the scan instrument 120, which in turn is connected to the target circuits. The system set forth in FIG. 1 is exemplary, showing only one illustrative system with which aspects of the present inventions may be associated. Other variations are included within the scope of innovations herein. Referring to FIG. 1, the targets 110 to be validated may comprise one or more circuit boards plugged into a chassis rack housing 115. Here, for example, key circuits contained within the circuit boards, whose firmware is to be validated, typically include and are controlled by a microcomputer 130 which has a JTAG debug port and executes stored firmware programs read from Flash memory devices.

Consistent with the system of FIG. 1, a scan instrument may be coupled to a series of chained JTAG debug target circuits. For example, such systems may include wiring to chain the JTAG ports of multiple circuits together, enabling connection to a standard industry JTAG scan controller test access port (TAP). The scan instrument 120 shown here is illustrated in the context of a platform component, though it may be within or associated with other components, be of different form factor, etc., and is referred to in this disclosure as the "scan controller," "scan instrument" or simply "instrument" throughout. Such instrument may manage the signal sequences driven toward and received from the target circuits via the chained debug ports. Signals, here, in this example may be signals that comply with the JTAG protocol and convey microcomputer debug commands and responses to operate this feature concurrent with runtime application execution.

In the illustrated embodiment, the scan instrument 120 is also connected via an Ethernet 140 (or similar attachment) to the internet, either directly, and/or may be connected via an intermediate local client host computer. As such, the instrument may be configured as visible to a remote web server 150, which can direct the scan instrument 120 to use the microcomputer debug command features and receive information collected from the subject target circuits.

As explained in more detail below, the validation or scan instrument 120 may periodically stop each microcomputer to incrementally extract Flash memory (and/or stable RAM) fragments at addresses of interest. Then, the scan instrument may allow the microcomputer(s) to continue running application execution during the bulk of interleaved times, via features and innovations having minimal impact on operation. These shall constitute minimal stop/run memory extraction cycles applied to the target. A total or a subtotal of collected firmware content is then algorithmically processed to calculate a unique signature representation (such as a hash digest code), also referred to as a vector of the sampled code. The resultant signature may, for example, be transmitted via the internet to the remote server 150, which then receives the calculated signature for comparison to the known/desired reference signature value for the given circuit or system.

The remote server 150 may also supervise the local scan instrument to schedule and launch each firmware extraction activity. Further, in some implementations, only the signature code of the firmware content, rather than the firmware content itself, is transmitted over the internet, maximizing security and minimizing communications time. However, transmission of the entire extracted firmware set of values also remains a viable alternative. As a further security defense, the signature generation algorithm may include coding features, such as random numbers, time-stamps, etc., that are provided from the remote server and appended to the extracted Flash values during hash digest generation. Use of such coding features, like random numbers or time stamps, may also be used to alter the results each cycle time, determinable by the remote server, and prevent or confound attempts to analyze target Flash patterns by unauthorized listeners. Such features would also prevent the substitution of the unchanging signature as a deception (e.g., by clandestine man-in-the-middle network sources), when the actual circuit signatures may have changed due to corruption.

Certain embodiments may employ microcontroller debug port features, e.g. EJTAG or COP (computer operation port) that avoid requirements for special accommodations in the circuits or firmware of the products being validated. Such commonly provided port is a built-in test access point distinct from all other microcontroller application interfaces used for conventional i/o with peripheral devices (e.g. memory). This dedicated debug port (typically using the JTAG protocol) enables external intervention of the normal processing to support test operations. It includes briefly suspending normal instruction code fetching and execution. It further enables commanding suspended microcontroller to convey memory content from circuit storage to the external instrument. The microcomputer can further be commanded to resume code execution following the point of suspension.

Additional debug features may also be provided via the systems and methods herein including commands for writing memory storage from the external instrument, single-stepping the fetch/execution of an instruction, jumping to an out-of-sequence code branch, and performing other cpu actions. These features may, for example, avoid the need to build such products with special security validation hardware or software elements since the external instrument can access memory content fragments in between normal instruction executions by the microcontroller via its debug port. This method essentially cycle-steals brief time intervals from the normal cpu processing to gain visibility of memory content. Accordingly, off-the-shelf target circuits can be accommodated and/or secured in accordance with these embodiments. Further, certain implementations may be configured to avoid inclusion of any circuit firmware embedded processing in the signature outcome, lest surreptitious corruptions might be installed to mimic the proper outcome and/or conceal deviations that are present. Indeed, in some implementations, the validating signature may be created as an exclusive function of only the stored firmware patterns, e.g., as externally observed with no assist from the validated code itself. However, even these features do not necessarily preclude the scan instrument downloading temporary assist code into RAM and commanding the target microcomputer to execute such helper routine(s) to expedite the collection and signature operations. Some of these innovations may, however, require knowledge of such available RAM space so as not to perturb the application processing underway.

As mentioned earlier, an instrument which operates one or more of the circuit debug ports may be operatively connected to the network either directly, such as via an Ethernet port, or indirectly, such as via assistance from an intervening local processing component or client computer. In the latter case, the local computer may be operatively connected to the network, under the control of the remote server, and in turn would expose a port capable of communications with the instrument. Here, the scan instrument and/or computing component may include driver software to enable access between the network and the attached instrument, and support debug interactions with the circuits being validated. As such, a scan instrument connected directly to the network or as assisted by a separate communications server computer may be implemented in accordance with various embodiments herein.

Embodiments disclosed herein employ the attachment of test equipment that connect to and operate the debug features of the circuits' microcomputers, enabling incremental extraction of stored firmware data as a background operation. The external scan instrument may operate the target microcontroller via its debug port by sequential commands to stop normal execution after the current instruction, convey to the instrument the certain context registers for preservation, convey to it one or more words from memory (non-volatile, e.g. flash, or volatile, e.g. RAM) for extraction, convey saved values back from the instrument to certain registers restoring context, and continue normal execution at the instruction following the stopped one. By repetitions of the above cycle, allowing for significant intervening runtime intervals of normal processing, the scan instrument can extract sections of memory content for later signature compaction/encryption and pattern validation with minimal disruption. As described, no special hardware (besides the debug port) nor embedded code routines are required in this operation. The primary impact on the target system, to be accounted in the judicious timing design of this method, consists of the multiple brief suspensions of application code execution. These may somewhat diminish target performance capability (due to processor cycle-stealing) and postpone interrupt response to random events (while the microcomputer is suspended). The first impact relates to how much processing head-room is available in a given target system, which may experience some degradation. The second relates to target responsiveness to indeterminate external occurrences, which signal the interrupt processing redirection to handler routines as special services are demanded.

Keeping the memory extraction cycles minimally brief and maximally sparse are design goals accomplished in the incorporation of the systems and methods herein. These extraction cycles can be performed while the microcomputer is running application code, although the microcomputer may be momentarily stopped then restarted between instructions. The extracted information may then be conveyed to a remote location or server to be compared to a known correct reference signature, to validate its unaltered integrity. Either the extracted information, or a computed unique signature representation of it, may be communicated to a secure site for comparison. Here, for example, code patterns may be processed into a compact SHA-2 (or similar) hash digest signature for uplink to an off-site secure server via a network like the internet. Aspects of innovations herein may also include functionality that provides signature variance for each instance of code transmitted. Further, systems may include other features that enable validating compliance of firmware code patterns as authorized at delivery or upgrade, such as being configured to perform testing and/or comparison automatically and/or periodically.

As set forth above, a remote computing component or server may provide secure checking of computed signatures. According to various embodiments herein, such component or server may compute a correct, original reference signature from factory source code. Here, for example, a manufacturer may provide detailed CPU features, memory map(s) and timing behavior of the target. In some implementations, this information enables the instrument to be configured to extract only critical, non-altering firmware sectors and, possibly, stable RAM. Such information may also inform the developers how to configure scan instruments for optimum adjustment of target CPU stop/run cycle disruptions. Indeed, cooperative disclosures by circuit developers may be required for certain circuits and systems.

As indicated above, various embodiments of the present innovations require no special target accommodations, other than a microcomputer debug port. However, the attachment of test equipment instrumentation, herein, is not intended to always exclude cases where such instrumentation's assembly of components or functionality is incorporated into the circuit being tested. Similarly, such instrumentation might be incorporated into a distinct computer as an augmentation plugged into or housed within its enclosure, and all such permutations are included within the context of the innovations herein.

As one example, various common microcomputers support a JTAG protocol debug port, through which aspects of the innovations may be facilitated. Such debug capabilities are to be distinguished from legacy boundary scan features of JTAG, in general, which focus on IC device pins connection testing and thereby enable a number of standard circuit testing methods.

FIG. 2A is a block diagram of an illustrative system 100 involving a scan instrument 120 according to a certain implementations. Here, a target 110 is connected to a scan instrument 120 via a interface or connector 115 to perform testing of the relevant circuitry and/or extract memory content. While the following description generally refers to a target 110, the innovations herein also apply to circuits, boards, devices, systems, other components, etc. Together with a computing component 130, which may be a processor, blade, personal computer, etc., the exemplary scan instrument 120, here, is illustrated with or within local components 140 placed within immediate proximity to the test circuits(s). These local components 140 may be part of a unitary local processing system, that may house both elements, or their functionality may be distributed into two or more subcomponents, as described elsewhere. Local components 140 may communicate with a remote server 150 over a network, and may optionally include a display/GUI/browser subcomponent 132, such as in computing component 130. Remote server 150 may contain or access a library of board-specific information and test scans 152, and may also include user interface 156 components/functionality, in addition to other software, such as scan instrument hosting software 154. In addition, computing component 130 may also include one or more testing components 134, drivers and port/connectivity related components 136, as well as other test scan components 139. Further, the core scan instrument hardware 138 may reside in the computing component 130, or it may be part of the firmware 122 installed on the scan instrument 120.

In addition or alternate to the in-band interconnections disclosed elsewhere herein, interface or connector 115 may include a JTAG connector associated with an increasing quantity of circuit boards and/or devices and/or systems. For example, such JTAG connector may support a test interface to the outside world for the board, pass signals which drive toward integrated circuits (ICs) accessible via the JTAG port to provide sequential shift in bits, feed control and clock signals to all the participating circuits/ICs, and extract sequential bits as collected along the chain. Further, the JTAG connector may, in some implementations, be indirectly operated by a host computing component. Here, host software may determine or assist in determining the particular code to access and verify and/or test pattern to use, and may also identify a particular meaning for these patterns (type of scan), as modified by the control signals, applied to the subject patterns.

The software may also collect the stream back to the host for analysis, wherein it may interpret the data according to the type of code and/or scan cycle obtained. In some implementations, however, the software may not be cognizant of the exact timing and protocol sequencing of the signals since they are scanned into/out-of the chain at the electrical level. In these implementations, JTAG specific scanning protocols may be handled by intermediate scan instrument hardware, under host direction. These implementations may also include dedicated hardware or firmware that afford faster scan shift processing (expediting the potentially large number of permutations to run and long chain length) than is otherwise available via existing processing over standard ports, which cannot enable such higher rates. Such scan instruments can also facilitate other electrical requirements peculiar to the board under test, such as special voltage levels, or signal edge transition rates, not readily accommodated by the computer directly.

Consistent with these features, scan instruments 120 may include or be loaded with hardware, firmware and/or software subcomponents configured to do one or more of the following: (1) interface with the host (or other computing component) via one of several standard link protocols, depending on platform and/or instrument model; (2) interface with the target according to the JTAG protocol at high speeds; (3) accept commands from the host which launch specific scans, types of scan sequences, and/or memory extractions through the target. JTAG chain; (4) accept bit patterns from the host to shift toward the target scan chain; (5) collect return bit patterns from the target and convey them back to the host; (6) create the proper serial bit stream signal pattern toward the target; (7) create the proper timing and control signal sequences to operate the JTAG shifting according to that specification; (8) provide peculiar electrical signal conditioning as required by the connected board (such as voltage level or signal rise/fall rates); and/or (9) provide any additional setup and status functions to facilitate management of the instrument 120. Scan instruments and related systems and methods herein may also include features and functionality set forth in U.S. application Ser. No. 12/641,627, filed Dec. 18, 2009, published as US2010/0180169A1, which are incorporated herein by reference in entirety.

Figure 2B:
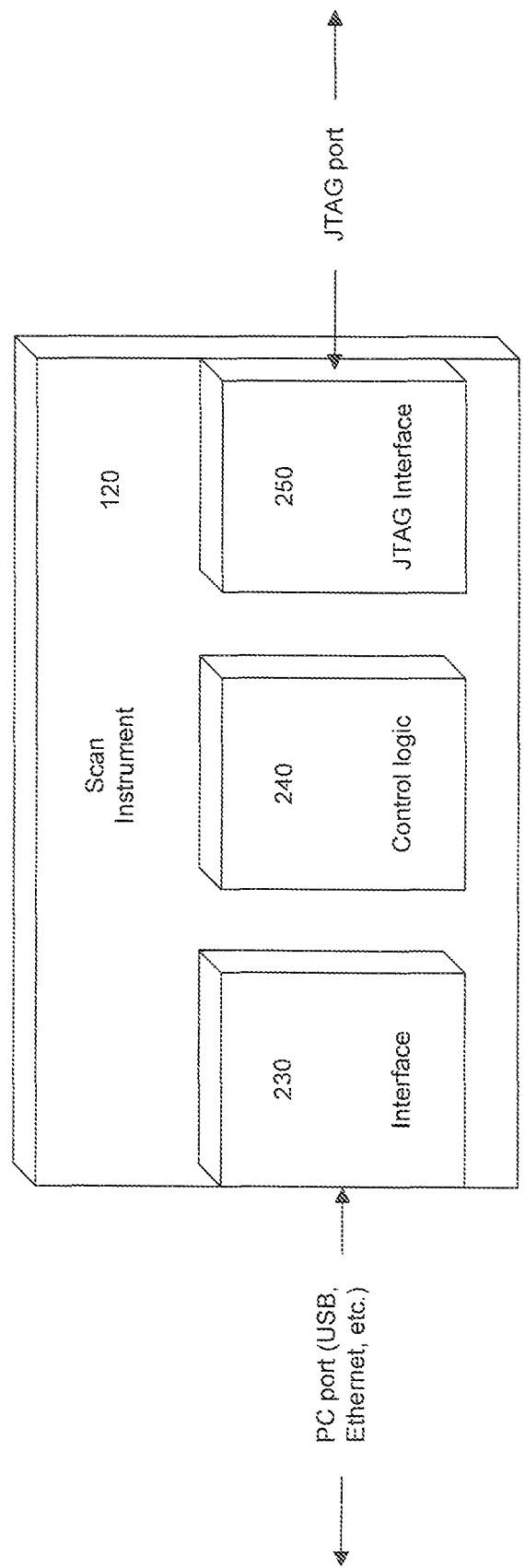

FIG. 2B illustrates a generalized structure of an exemplary scan instrument 120 that may be configured with such features and wherein appropriate scan processing may be performed. While the basic blocks within such scan instruments are, in general, known, installation and operation of certain features herein enable innovative control of the scan instruments and/or management of scan instrument functionality remotely. For example, scan instruments 120 according to aspects of the innovations herein may be configured to have no direct involvement with the target's firmware. Additionally, the scan instruments 120 herein may be configured to run continually while the target is running, to gain control of its operations, including briefly stopping the CPU(s) to run scan sequences in order to obtain segments of embedded code, followed by running the CPU(s) allowing continuance of its application execution. As such, scan instruments 120 are generally configured differently than legacy boundary scan components, such as not being programmed to functionally disable a target so that its device pins can be driven and sensed in an arbitrary manner (interconnect testing). Such configuration(s) focus the scanning on processor-connected diagnostic features, only (e.g., relating to microcontroller scanned in/out debug command control exchanges), as against configurations directed to typical pin input/output control scanning (e.g., relating to whether or not chained device pins are interconnected or not on the board by circuit traces).

In some implementations herein, the instrument 120 may be fully embedded in the board environment, with relevant operating system and application(s) being fully integrated therein. Moreover, such scan instruments may be configured as completely stand-alone, such that they require no resources embedded elsewhere to assist in validation processing. Further, the control logic 240 may be configured to generate hash codes within the external scan instrument 120 after extracting the target firmware code, wherein only a signature pattern is conveyed to a remote security validation component to make the check comparison. As to operation, control logic 240 receives information from and transmits communications to a server or computing component via interface 230, which may be a standard interface in certain implementations, and processes communications regarding the target via a JTAG interface.

Figure 3:
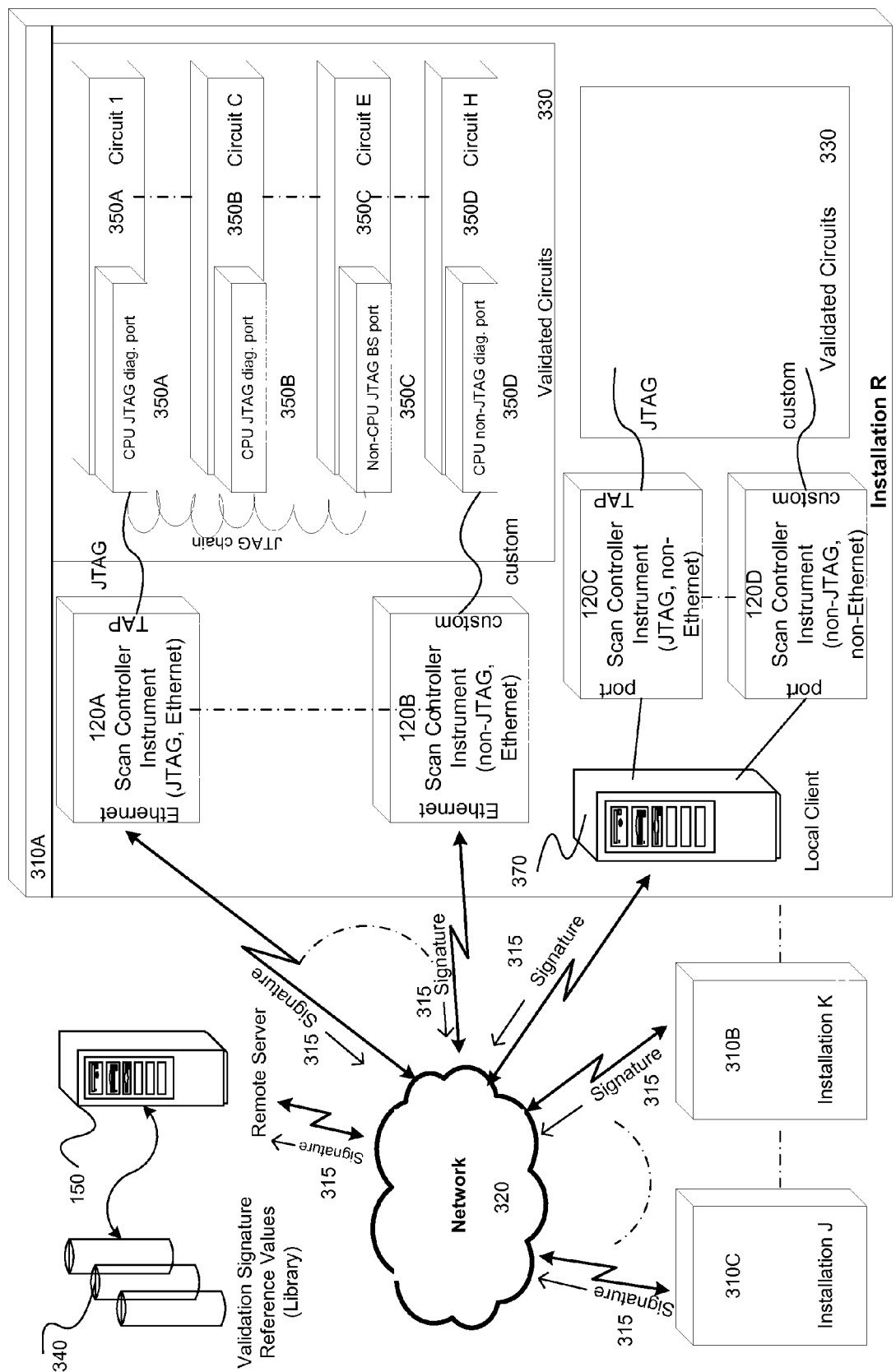
FIG. 3 is a block diagram illustrating various exemplary elements and network connections, including target debug ports and client server connections, according to certain implementations.

FIG. 3 is a block diagram depicting exemplary elements and network connections, according to certain implementations. Referring to FIG. 3, various permutations of elements, scan instruments, target debug port types, and differing (direct versus local) network connections are illustrated. FIG. 3 illustrates a server 150 that may contain or access a library 340 of validation signature reference values, a network 320 by which the various signatures are transmitted 315, and one or more test installations 310A, 310B, 310C. Within each test installation, scan instruments 120 are connected to target boards for microcomputer debug visibility and/or control. For example, the instruments 120 may be directly connected to JTAG debug ports on the boards, as many circuits contain such JTAG debug ports with socket access employed for development emulation, initialization or testing. Further, targets in the chain with non-processor component JTAG boards or components 350C may also be accommodated, via instruments 120 configured with protocols that serially focus on one board/device at a time. One exemplary test installation 310A shown in FIG. 3 comprises a local client 370 as well as one or more types of scan instruments 120A, 120B, 120C, 120D, which are coupled to one or more circuits to be validated 330A, 330B. The illustrated embodiment shows multiple configurations, including instruments 120A, 120B coupled directly to the network 320 as well as instruments 120C, 120D coupled to the network via a local client computer 370.

The embodiment of FIG. 3 shows an instrument 120A connected to a chain of target circuits 350A, 350B, 350C (e.g., connected under JTAG protocol, etc.), as well as an instrument 120B connected to a non-chained target circuit 350D (e.g. using proprietary protocol, such as BDM, SPI, MDIO, or RS-232, etc.). FIG. 3 also shows scan instruments 120C, 120D configured for non-ethernet connection or communication to a network or remote component, indirectly. In some implementations, these instruments may be configured as either JTAG instruments 120C for coupling to targets via JTAG ports on the boards, or as non-JTAG instruments 120D for coupling to targets via non-JTAG diagnostic ports or means. Turning back to the Ethernet scan instruments 120A, 120B, FIG. 3 illustrates two types of instruments as well as various exemplary connections and ports 360A, 360B, 360C. A first type of Ethernet instrument in FIG. 3 is a JTAG scan instrument 120A coupled to a JTAG chain of circuits 350A, 350B, 350C. As shown by way of example and not limitation in FIG. 3, first circuit 350A and second test circuit 350B may be coupled to the scan instrument 120A via processor-type JTAG diagnostic ports 360A, 360B. Furthermore, additional circuits, like the third circuit 350C might be included in the JTAG chain containing only non-processor components and not participating in this firmware validation method. FIG. 3 also illustrates, as a second type of Ethernet instrument, a non-JTAG scan instrument 120B, shown coupled to a fourth circuit 350D via a non-JTAG diagnostic port 360D.

In summary, FIG. 3 shows the variety of circuits included in the validation hookup exemplary embodiment circuit installations (target circuit variances—JTAG/non-JTAG, chained/unchained, CPU-debug/non-CPU-devices: scan controller instrument variances—JTAG/non-JTAG, chained/non-chained attachment, Ethernet-direct-connect-networked/local-client-networked). It also shows the overall system topology of a central network linked remote server with attached validation libraries, capable of interacting with a distribution of scattered installations needing firmware validation.

Figure 4:
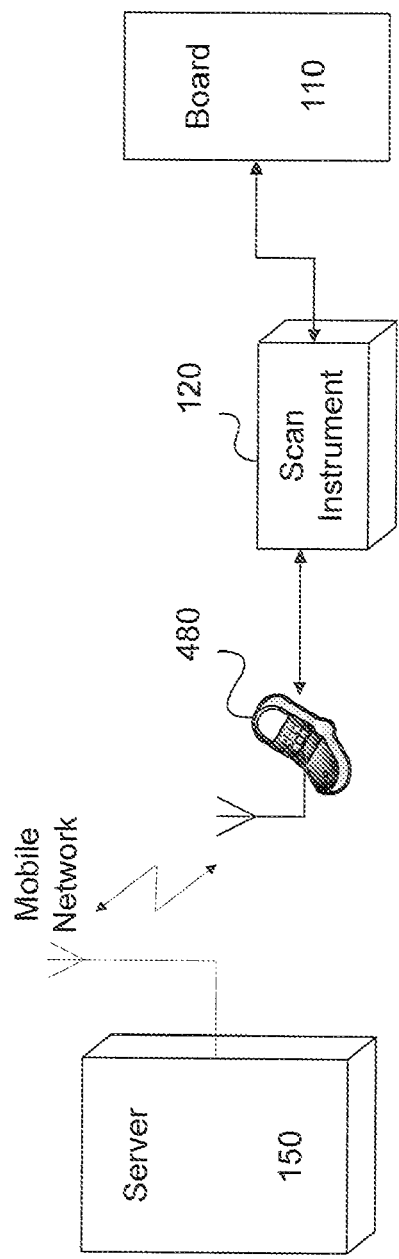
FIG. 4 is a diagram of a different remote scanning system and instrument, showing one of several interface permutations, according to a certain implementation.

Various other remote scanning systems and instruments, beyond those set forth above, may be realized consistent with the innovations herein. For example, FIG. 4 is a diagram of a different remote scanning system and instrument, according to a certain implementation. It shows an illustrative configuration of an exemplary scan installation positioned at the local target test location. FIG. 4 shows a scan instrument 120 coupled with a mobile device 480 to engage its capability to transport data in either direction with a remote element-such as a server. The implementation of FIG. 4 greatly enhances the flexibility of the scan arrangement by allowing alternate connectivity with a central server where wired network access is unavailable. In such case, an application may be loaded into such mobile device to operate the attached scan controller, via commonly available connections such as USB, as its local client. Further, in the various other implementations disclosed herein, a stand-alone scan instrument may also be of a form-factor to enable mounting directly to the target board, which is space-saving and provides convenience as well as added functionality.

Figure 5A:
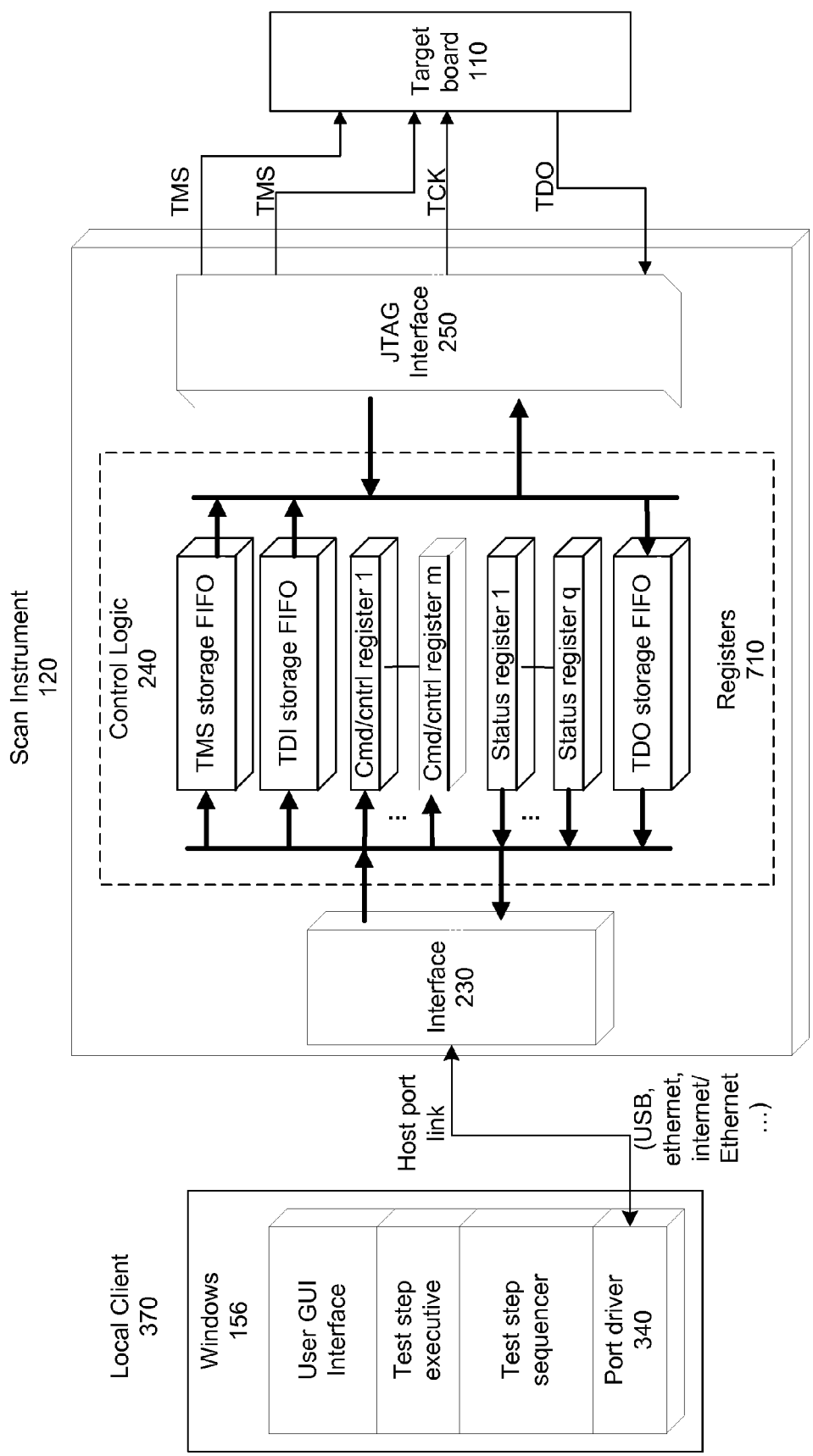
FIG. 5A is a block diagram of exemplary local distinct computing elements showing one of several standard port interfaces to a scan instrument, according to certain implementations.

FIG. 5A is a block diagram of an exemplary local computing client configuration showing one of several standard port interfaces to a scan instrument, including some functional elements within for performing testing/scanning/extracting, according to certain implementations. Referring to FIG. 5A, a generalized block diagram of the registers 710 seen by the local computing component software is shown, illustrating control/visibility of the scan instrument and for passing vectors to and from it. Such vectors may include addresses of memory from which data is to be extracted and the returned memory content itself. Again, this is merely an illustrative block diagram, as the configuration of various local components may vary, as described elsewhere herein.

Further, when conveying the commands/status/vectors to or from the local scan instrument 120, the local client computing component 370 may also encode/decode these data items into the transfer formats appropriate for the port protocol. For example, command register information destined for the scan instrument 120 may be encapsulated into TCP/IP packets for Ethernet linked versions. The local elements must also be provided with and/or process additional information to direct the message to/from the destination/source inside the scan instrument. In a similar manner, USB packets prepared for transmission contain similar information and formatting for that port according to its structures. The local client components may also be downloaded with software to manage all of handshake interactions on the bus according to the protocol underway. As such, in addition to creating the scan instrument register contents, downloaded software on the local client computing component 370 may create or unravel link related constructs and interact by appropriate protocol rules over the port. In some implementations, self-contained driver routines perform this job, which are dedicated to performing such communications, tailored to operate with installed port adapters, and available for download from the remote server 150. in the case that the scan controller instrument interface, 230, conforms with common network protocols, such as Ethernet, the local client component may be by-passed with the instrument connected directly to such network as controlled by the remote server.

When processing vectors in either direction, the scan instrument registers 710 that store the vectors may be required to be very long or numerous, i.e., to support arbitrarily long target chains. In these situations, the scan instrument 120 may implement them as an entire series of registers in the form of a FIFO (first-in-first-out) memory or other bulk memory storage methods capable of storing large amounts of ordered data. Such a FIFO or buffer is typically required for target returned scan vectors, as well, holding them prior to shipment back to the local client computing component 370 and/or remote server 150. To accommodate cases where the total vector length exceeds even such resources, mechanisms may be provided for the scan instrument to pace itself due to storage limitations. In one implementation, for example, the scan instrument momentarily halts target shifting if it needs new TDI vector bits and the FIFO is empty, or the TDO storage FIFO is full awaiting uplink to the PC, leaving no room to collect more from the target.

Figure 5B:
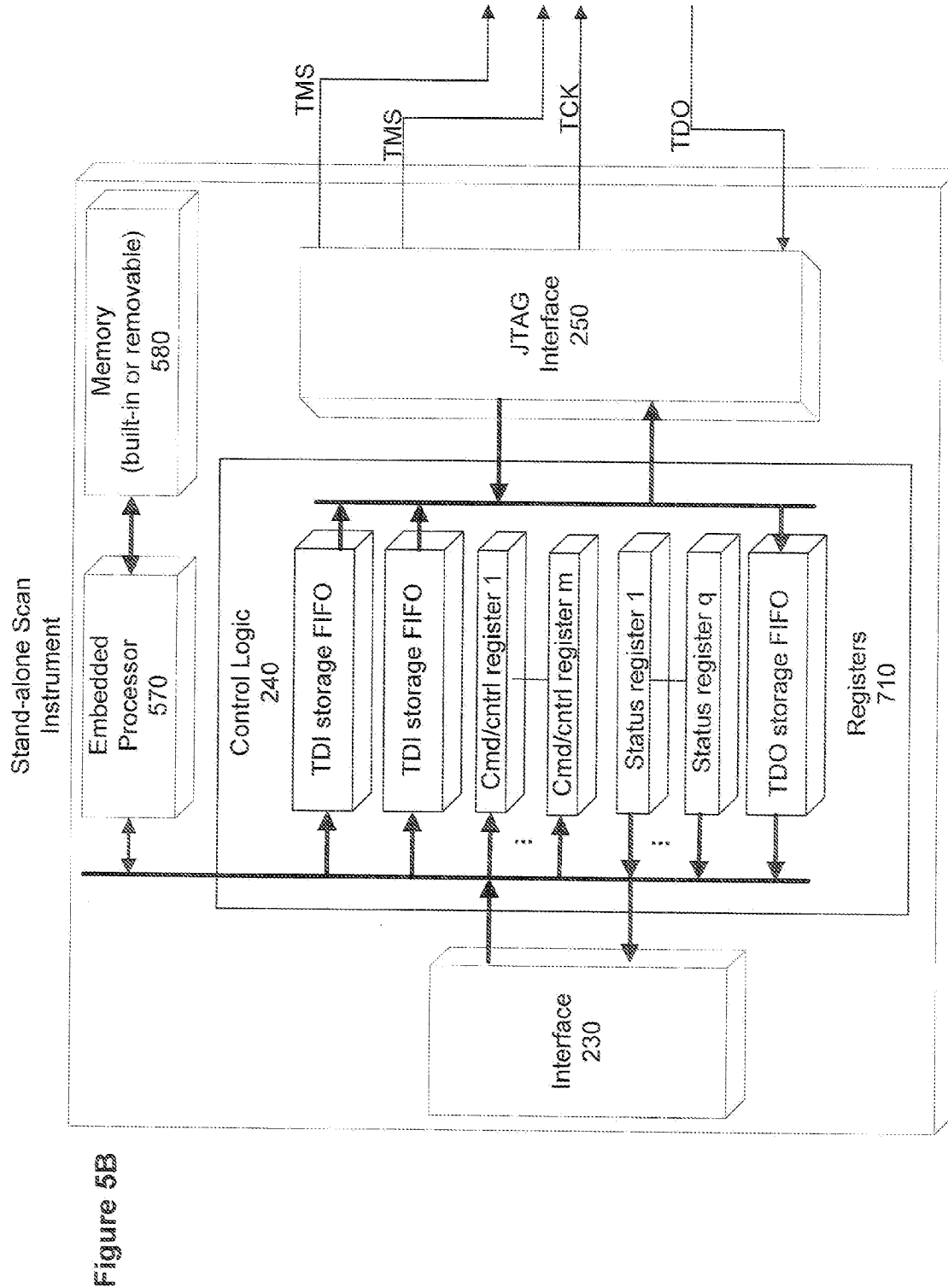
FIG. 5B is a block diagram of an exemplary local stand-alone scan instrument, showing functional elements within for performing scanning, according to certain implementations.

FIG. 5B is a block diagram of another, exemplary local scan instrument of the stand-alone type, which includes added resources that enable features such as operation without involvement of other local client computing elements and/or saving test results for later upload. Referring to FIG. 5B, a stand-alone scan instrument is shown, which may include pre-loaded test plans and/or added resources to enable scanning while not connected to a local or remote computing component or platform element. For example, it may contain an integrated processor 570 as well as memory 580 (built-in or removable), configured to support being pre-loaded with test plan information, to enable scan operations on or memory extraction from the target, and to store results or memory content for later up-link to a host computer. The memory content may be downloaded over the external port of the scan instrument (e.g., USB) and/or loaded using plug-in removable memory elements or via other such techniques. Upload via the external port may be performed to retrieve stored test results or memory content stored in memory elements. This supports a highly portable implementation, where access to the target circuit may be difficult or remote by obviating the need to attach a computer during the test scanning. Such embedded processor may also include firmware enabling it to control an attached portable or mobile device, such as a smart phone (see, e.g., FIG. 4B) to operate its resources in the manner of a user I/O console. This could enable enhanced control and visibility of the scan instrument operations by exploitation of a commonly available mobile devices, handsets, smart phones, etc. typically carried by relevant personnel.

Figure 5C:
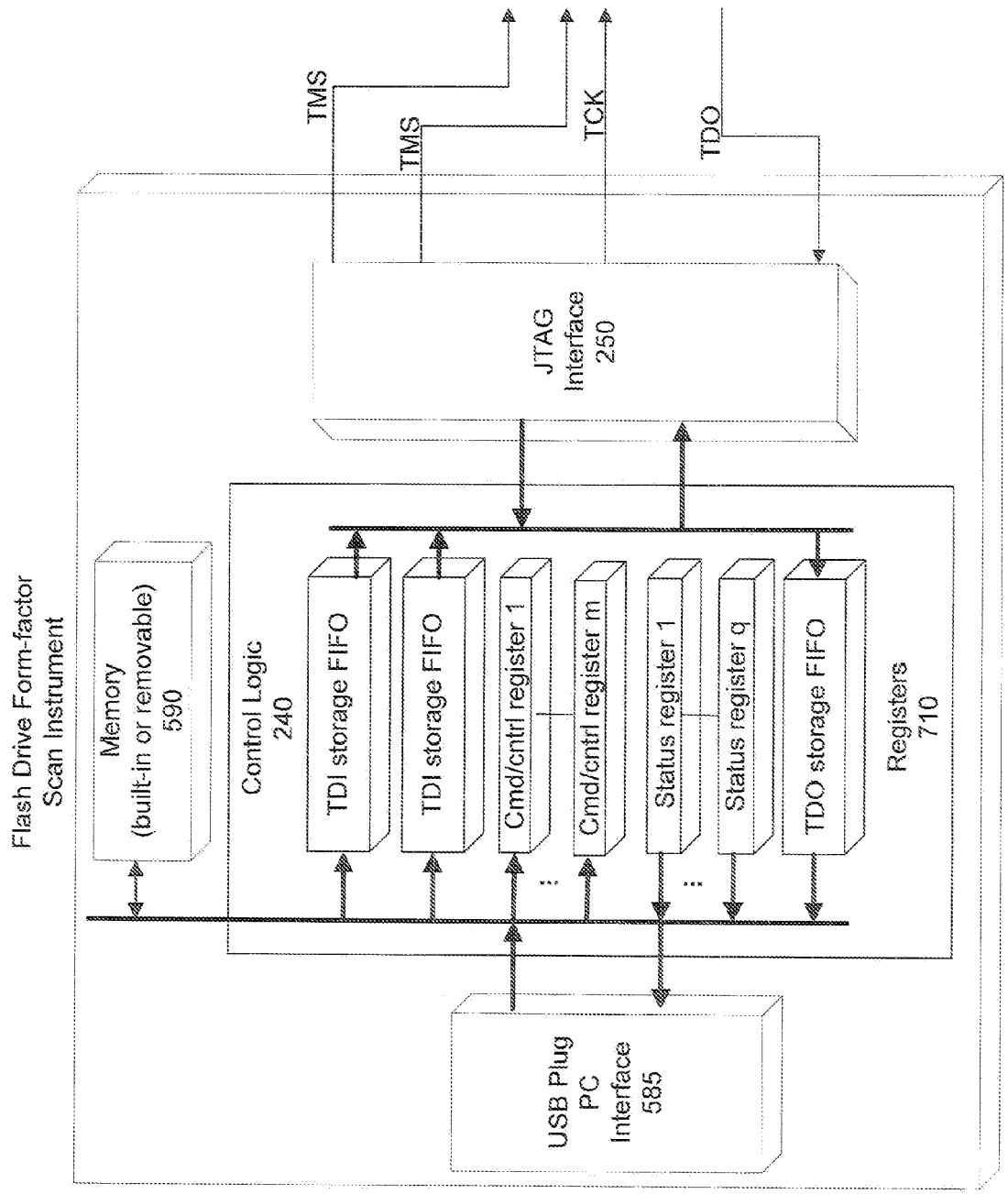
FIG. 5C is a block diagram of one local flash drive form-factor scan instrument, according to one implementation.

FIG. 5C is a block diagram of one local flash drive form-factor scan instrument, illustrating functional elements within for performing testing/scanning/extraction according to certain implementations. This version may include a USB plug 585 for coupling directly into a USB socket obviating the need for a cable between itself and this host processor. It may also contain memory 590 (built-in or removable) to enable uploading or downloading to/from a local computing component or platform of stored test plans and/or testing application software. In the upload case the test plan files and/or some or all of the testing software and/or data may be pre-loaded at the factory or depot prior to plug-in at the test location. Conversely, such memory may also be downloaded or reloaded with new test plan files or test software from the local component(s) into which it is plugged, including that received from a remotely connected server via a network. Such loading may occur at a separate time from testing as a preparation step. This supports high portability and agility for the scan instrument, and also enables easy hand-carry conveyance of test plans to a local test site where network access may be unavailable. Furthermore, if preloaded with the test application software, which can be uploaded to any plugged-in local component, such as a PC, it can provision any such local component, even if never initialized with test software, to, e.g., immediately become capable of scanning target devices. This modality can serve to transport software, test information, and target data in both directions to/from a PC.

FIGS. 6A and 6B are diagrams illustrating an exemplary JTAG debug scan process at the various levels in the hookup, including application processing at the remote server, the scan instrument, and the target circuit, according to one or more disclosed implementations. This figure depicts a remote server 602 process (FIG. 6A) which launches a given installation 614 (e.g. instance J) (FIG. 6B) to perform a firmware validation extraction using its scan controller instrument 614 process, via the network. This multi-scan process may be applied to one or more circuits (e.g. circuit number CIR through LAST_CIR) in the installation each of whose firmware is to be validated. In turn, each circuit may have one or more non-contiguous blocks of firmware content (either non-volatile . . . e.g. flash, or volatile . . . e.g. RAM) to be collected and included in such validation. Such blocks (each of a given block size), each commencing at a particular memory address will be combined to produce a signature for uplink, for its particular circuit. The extraction will occur in increments of at least one up to chunk count words to gather from the target per minimal target stop/run cycle. For each interaction with the target (sending commands, depositing data or extracting data), the instrument will perform one or more. JTAG scans of a number of bit shifts.

An exemplary validation process, as shown here, may begin from an initial, non-scanning state 602 (FIG. 6A) as present at the remote component or server. When a start to the installation/validation process is triggered 604, the remote server issues a launch validation instruction 608 through a network 610 or communication link between the server and the other system elements. The launch command is then transmitted 612 (FIG. 6B) to the scan instrument, which may be in an initial state 614 of the validation process. When the launch command is received 616, the scan instrument identifies and selects the circuit 620 upon which the first scan/analysis is to be performed. Next, the scan instrument determines the addresses to be read 622 and validated, including identifying or loading lists of target address blocks and the CPU node information needed to perform that particular scans 624. Each block is comprised of a start address and a contiguous number of words to be extracted, spanning a related block size count. The block extractions are segmented into chunks of one or more words requiring a certain time slice duration each, depending on scan rates and target features. Each such chunk time slice is interleaved with significant periods of normal cpu application code execution, with a ratio selected to minimize performance impact. Multiple scattered chunk count word extractions are repeated until all blocks have been extracted. Here, and throughout the following test sequences, the scan instrument may be configured to transmit JTAG scan vectors 625 to the circuits being tested.

Turning back to the representative process shown in FIG. 6B, for each chunk of extraction to be performed, the instrument scans a stop command 626 to halt the target CPU after its current instruction execution. In the illustrated example, this command is scanned into the debug (JTAG) port 628 of a given CPU while it is running its application 630 code. Here, for example, the CPU may have been executing a certain application instructions 632 as various debug commands 633 are being transmitted, such as when the stop command is scanned in 634. Upon receipt, the CPU halts execution of the application instructions 636 after the one underway as depicted in FIG. 7. If a stop command is not scanned in 634, the next application instruction is obtained 638.

Referring again to FIG. 6B, the scan instrument then obtains one or more words 640 of CPU context during the momentary cessation of application processing, typically contained in device registers. Here, several prongs of code acquisition may be pursued depending on whether the data are to be accessed or lifted from non-volatile or volatile memory 642. Executable data words are accessed and saved, for example, from relevant RAM locations 646. If non-volatile nodes are to be accessed, then data words are accessed and saved, e.g., from the flash memory 644. After data from volatile or non-volatile memory are obtained, the CPU context is restored 648 and the run command is scanned in so the CPU processing of application(s) may return to a run state 650. As with various other debug commands being transmitted 655, the target circuit(s) will receive this run command 654, in response to which the CPU of the target circuit(s) returns to regular operation, e.g., fetching the next instruction 638 in the customary loop of processing the application instructions.

Once normal CPU operation is restored, the scan instrument confirms whether or not the last addresses scanned were the final addresses to be read for the circuit(s) being analyzed 618. If not (if there are additional addresses to scan), the scan instrument configures itself to scan the next addresses for the subject circuit(s) in the test sequence 660. Here, once the next addresses in the test sequence are loaded/configured for scanning, the scan instrument returns to the step of block sizing 624 in the process of commencing CPU halt and data collection routine to thereby obtain the data for that next address test sequence. This loop of updating the addresses to be scanned 660 and performing the halt and collect routine for the updated addresses and blocks is performed until all of the desired data is collected for the identified addresses. Once the final data is collected for each subcomponent of addresses scanned or the total addresses desired, the scan instrument may then compute information, such as a signature, regarding all the collected data to be validated 662 for transmission 664 via the network.

Once all addresses for a particular circuit are scanned, the scan instrument confirms whether or not the last circuit scanned was the final circuit to be read 668 for the present test procedure. If not (if there are additional circuits to scan), the scan instrument then initiates a process of scanning the next circuit 670, in the test procedure being performed. Here, once the next circuit for scanning is verified, the scan instrument returns to the step of confirming the addresses to be scanned 622, before commencing the overall loop process of performing the CPU halt and data collection routine for each address and/or block thereof, to thereby obtain the necessary data to complete the test procedure. If, at 668, the scanned circuit is confirmed to be the last circuit to be scanned for the instant test procedure, the scan instrument returns to a holding state 614 to await receipt of the next launch command 612 to begin a subsequent test procedure.

Once one or more signatures are received 672 (FIG. 6A), a signature comparison operation may be performed 674 to determine whether or not the received signatures verify that the circuits under scan posses the desired configurations. While this verification process is illustrated in the server context in FIGS. 6A and 6B, such verification processes may also be performed at the scan instrument as set forth elsewhere herein.

If the signatures successfully verify that the circuits possess the desired configuration(s), the remote computing component or server may log a tag and/or generate indications that the circuit(s) or installation being verified have the correct/desired configuration 676. Conversely, if the signatures verify an incorrect configuration or operation, the remote computing component or server may log a tag or generate indications that the circuit(s) or installation under verification has failed to demonstrate the correct/desired configuration 678. Finally, the remote computing component or server confirms whether or not the installation under test was the final installation to scan 680. If not, the remote component or server determines the next installation to test 682 and proceeds to the step of verifying whether or not a state/start event has occurred, where commands to launch the validation of the next installation are then initiated 604. If, at 680, it is confirmed that the installation just validated was the last installation to be processed, the remote component or server returns to the initial, idle state 602 to await the next scheduled validation time.

As indicated above, an attached instrument can operate the debug port features of the internal processor (CPU) by conveying behavior control sequences using the shifted signal patterns, according to the JTAG IEEE-1149.1, IEEE-1149.4, IEEE-1149.5, IEEE-1149.6, IEEE-1149.7 or similar protocol. Further, given the daisy-chain architecture of this protocol, multiple ports, of a given circuit and/or several such circuits in a system, may be wire-chained together with a few signals providing access to each of them in series. By means of this approach, a connected instrument may inject CPU commands and parameters, while extracting status and data, independent of and concurrent with the other application input/out portals of each microcomputer. Here, some exemplary debug port actions that may be employed to control the internal processor (CPU) for this purpose, include: (1) stop application program runtime execution between instructions; (2) extract CPU context (such as register values); (3) read addressed firmware location(s) back to the test/scan instrument; (4) restore CPU context (such as register values); and (5) resume application runtime execution following the stopped instruction.

As such, an external scan instrument may command each microcomputer to stop executing the application between instructions, read and save the current microcomputer context, read the content of certain visible locations (specifically one or more words of program storage) conveyed to the external instrument for collection, and continue running the application firmware from the point of stopping with a restored context. By such techniques, an external scan instrument may access and acquire firmware storage incrementally while allowing the application execution to run most of the time unhindered. One impact on the validated circuit is the cessation of processor execution between two successive instructions, for a brief debug interval time slice.

FIG. 7 is a schematic illustration showing exemplary firmware extraction and timing features according to a disclosed implementation. Referring to FIG. 7, a diagram illustrating aspects of timing and firmware extraction mapped against CPU application processing is shown (as it proceeds in timewise fashion in the X direction). FIG. 7 depicts a CPU process 710 showing target CPU processing states prior to and during halt and read processes. As illustrated, the CPU process 710 depicts periods of CPU processing including states of standard CPU application run operation(s) 712 as well as states when the CPU is momentarily stopped 714 upon receipt of a stop command. The latter may commence sparsely interjected stop/run time slice intervals providing operation gaps (between application run periods) of short duration. Such commands induce scattered target dead/latency periods that enable acquisition of increments of desired data without substantial disruption of overall program/system operation. Further, a time slice 716, here, may be viewed as demarking the start of an "extraction period," which refers to one cycle beginning with the onset of a first CPU stop state 714A, continuing through a period of CPU application processing 712, and ending at the start of the next CPU stop state 714B.

Each CPU stop state 714 constitutes a slice 722 of CPU dead latency time during which the test scan features set forth in the bottom of FIG. 7 occur, according to a disclosed implementation. As shown in FIG. 7, each slice 722 may comprise a plurality of scans 724, 726 occurring between a first application instruction N 720 and the subsequent application instruction N+1 728. In one implementation, the plurality of scans may be made up of overhead scans 724, directed at overhead tasks like stopping or starting the CPU and saving or restoring the contexts of the various registers, and payload scans 726, directed to extracting chunk number of bytes of the firmware (flash or RAM) content. Each scan period may also include an associated communication of corresponding scans of information 740 between the scan instrument 742 and the target JTAG debug port, by the shifting of multiple JTAG scan bits. In the implementation shown in FIG. 7, an exemplary time slice 722 may include: one or more first overhead scans 724A comprised of commands and data for stopping the CPU and extracting contexts from the registers; one or more payload scans 726 comprised of commands and data for extracting chunk number of bytes of firmware contents; and one or more additional overhead scans 724B comprised of commands and data for restoring contexts to the registers and reinitiating the CPU run state.

CPU stop/run intervals consistent with the innovations herein may, in some circumstances, induce scattered dead/latency periods in the target circuitry or CPUs. One impact of such dead spots or delays is that precise real-time behavior may be slightly altered. The impact of the scattered dead/latency periods depends heavily on the architecture and the functionality of the target and target applications. Minimal impact is seen, for example, in applications comprised of numerous concurrent tasks sharing the CPU at random times. Whereas, the greatest impact may be on applications that are sensitive to real-time processing responsiveness. Here, however, detailed knowledge of the targets may be utilized to overcome or accommodate these issues. For example, duty cycles and stop/run periods of the algorithms may be adjusted to minimize latency and performance impact in accordance with the hardware limits. Consider that the dead/latency interval may degrade interrupt handler routine entry response. This is due to external real-time event or timer signals effecting process reaction in a somewhat delayed manner during such stopped states. Further, implementations may be configured to include worst-case resulting process deferral to avoid unacceptable effects. According to some embodiments of innovations herein, exemplary stop/run latency periods using selected parameters may be about 1 millisecond. Here, 'selected parameters' refer to reducing dead time latency by maximizing JTAG SCL clock rate (consistent with target and scan instrument capability), minimizing context saving/restoring information, and minimizing chunk extraction count. It also entails optimizing the ratio of extraction stop/run to overall period time to reduce performance impact, while keeping the overall signature cycle time from becoming impractically long. In one practical example implementation, scanned data may be acquired at a rate/quantity of about 128 byte chunks per cycle. Consistent with such embodiments, inter-extraction periods of about 30 milliseconds per stop/run chunk may be usefully employed.

Such stop period, albeit brief, may introduce issues to be resolved given the potential alteration of real-time flow. Such considerations may include effects of random processes outside the processor, including timer events, that elapse during stopped intervals. These may continue to generate interrupts, whose response is deferred due to the stopped state, delaying the entry to handler routines. To resolve such issues, innovations herein may rely on intimate knowledge of the circuit(s) and the associated algorithms to minimize repercussions to the runtime application, as controlled by the stop/run duty cycle. For example, minimizing the overhead times including maximizing the scan rate (faster SCL clock) and minimizing chunk size, while increasing the extraction period for reduced performance impact (at the expense of overall signature creation time). Additionally, particular stop/run duty cycle algorithms may be employed to halt and access the data as a function of the microcomputer and overall system hardware, features and/or functionality.

In other embodiments, in accordance with the above target performance concerns, the target microcomputer may be held stopped only for brief intervals over widely scattered periods to minimize foreground execution impact. Here, the stop/run time to extraction period time duty-cycle algorithm would be traded off against the performance rate of the overall firmware collection cycle. For example, a less intrusive and disruptive target extraction algorithm may result in longer signature production and uploading time, to be traded off. Accordingly, engineering and fabrication of scan instruments and/or associated algorithms that implement such innovations may include an optimization process that takes into account adverse effects of the relative stopped interval time versus minimum time to complete the validation.

Extension to General Circuit Hardware Validation

The present innovations are compatible under many circumstances with legacy hardware testing as supported by JTAG. As such, systems and methods herein may include such extended circuit validations. For example, circuits linked in the chain while not containing microcomputer debug port(s), though including boundary scan hardware JTAG access, may be scanned. Thus, a circuit which does expose a microcomputer JTAG debug port may include other non-microcomputer components in the chain. In general, a JTAG chain might link circuit boards, components, and systems having a combination of elements including microcomputer debug ports and general digital devices.

All chain elements can be focused on at any point by the JTAG protocol, whether a microcomputer debug port or other component with legacy JTAG features, in sequence. In some implementations, the inclusion of such scanable, non-debug elements also enables automatic hardware integrity checking, i.e., beyond the primary application herein of firmware validation.

This latter extended activity (legacy boundary scan testing) typically requires that devices be put into a dedicated non-functional test state which enables arbitrary pin-connected signals pattern setting and sensing. This opens up the whole world of JTAG capabilities such as checking signal opens/shorts, working/installed devices, loading/uploading programmable devices (EEPROMs, CPLDs, PLDs, FLASH memories, etc.), without involvement of any microcomputer execution on the target. Such enhanced capabilities are included in certain aspects of the present innovations, e.g., where the target application functionality can be disabled. Additional JTAG general testing, beyond the subject firmware validation scheme, also may include CPU debug port methods whereby the target processor is operated in an emulation mode. This includes the external scan controller, under host direction, commanding cpu operations to widely test the subject circuit board, including i/o activity with all visible resources, running code at full-speed (faster than legacy JTAG boundary scan), running temporarily downloaded test routines (with or without assistance from embedded firmware), and the programming or uploading of programmable devices in the addressable CPU space.

Additional Embodiments

Further embodiments may involve systems where differing non-JTAG protocols (e.g. BDM, SPI, MDIO, or RS-232) are supported by a given circuit's microcomputer debug port. Here, device-specific protocol variant systems consistent with the present innovations may utilize an instrument with an interface operated in accordance with its requirement(s). Such variation of serial command protocols may be accommodated to perform the above firmware extraction for validation process, using appropriately altered shift patterns (as opposed to JTAG). They may be operated to perform the cpu time slice extraction in similar sequences. Here, instruments may be separately and concurrently connected to the network along with other instrument types (such as the JTAG type above) to be operated in turn by the remote server when it must validate this connected circuit. For example, such instruments can be operated and controlled over a network by distinguishing each such instrument according to its unique network address (such as Internet IP address). Thus, a suite of scan instruments of varying type may be implemented to accommodate the alternate debug port types required to validate the complete set of circuits in totality, each with its appropriately connected instrument: Those ports with protocols supporting a chained hookup (similar to JTAG above) could be wired together to share a given instrument, while others would have their own dedicated instrument attached.

Added Security Functions

In addition to validating embedded circuit firmware to assure its uncorrupted integrity, the present innovations also support detection of suspicious circuit manipulations at the installation site. Here, unauthorized handling or tampering of such circuits may be sensed, e.g., as a part of a possible firmware corruption effort. For example, such systems and methods may involve features responsive to unexpected conditions such as depowering, removal or disabling of such circuit from its normal operable configuration setup, etc., and may also include aspects of signaling or communicating related to potential alteration attempts. In some implementations, these features may operate between the validation cycles, effectively monitoring the in-operation status of each circuit to support an alert system. By utilizing such in-operation features, systems and methods herein enable sensing schemes that allow confirming the desired circuitry to be continuously run, or 'kept alive', within installed circuits of interest, according to scheduled runtime intervals.

Some exemplary processes that may be implemented concurrent with running application operations include performing special scans of installed circuits via their JTAG chain, e.g., to confirm their presence and operable status. In the case of JTAG chain, for example, a protocol standard infrastructure scan of the connected chain may be ordered by the remote server to effect a rapid and convenient detection of all such connected and operable circuits. This monitoring causes no disruption of the ongoing application since infrastructure scans do not interact with device application pins. For non-JTAG protocols, similar non-disruptive interactions with the microcomputer debug ports may be implemented to achieve similar results.

Validating Only Firmware Sectors of Interest

The embedded firmware to be validated may consist of the entire memory storage resource on the circuit, or some subset of it. Here, for example, the server may identify to the instrument the address regions of interest to be validated, and those to be excluded from such scanning. As such, unprogrammed, don't-care, or runtime altered sectors of such storage media may be identified and avoided, enabling focus only on data storage areas with static relevant patterns. Accordingly, the validation process/cycles may be configured to cover a sequence of address blocks within such storage devices in accordance with the persistent regions. Despite discontinuities, here, generation of signatures or hashes still provides meaningful confirmation of such blocks concatenated into a single series of values, since the outcomes are repeatable. In some implementations, hash code algorithms based only on a given series of fixed ordered values may be employed, as these algorithms always result in a given outcome regardless of address groupings.

In the present description, the terms component, module, sequence, and functional unit, may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to graphics processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard mobile-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other embodiments of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more embodiments of the following invention.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

The invention claimed is:

1. A method of remotely validating memory content on a running target, comprising:
    associating at least one scan instrument with one or more diagnostic debug ports of a local microcomputer system including the running target;
    performing a scan process distinct from a boundary scan process, via the at least one scan instrument, via accessing at least one storage element associated with the running target through the one or more diagnostic debug ports to obtain system data during operation of application(s) operating on the running target, the scan process including:
        momentarily halting the application(s) operating on the running target; and
        reading content related to the application(s) from the at least one storage element in the scan process distinct from a boundary scan process to obtain test data;
    transmitting information regarding the test data to a remote site; and
    validating, at the remote site, the information to confirm desired system configuration and/or operation.

2. The method of claim 1 wherein the at least one storage element includes a non-volatile storage device.

3. The method of claim 1 wherein the at least one storage element includes a volatile storage device.

4. The method of claim 3 further comprising validating information including executable instructions stored in the volatile storage device.

5. The method of claim 1 wherein the scan process further includes accumulating information regarding the test data as a plurality of fragments extracted during the momentary halts.

6. The method of claim 1 wherein momentarily halting the running application(s) includes:
    commanding the running target to stop execution of the running application(s) between instructions;
    reading and saving the current target context(s);
    collecting values of data stored at desired locations within the at least one storage element;
    restoring the current target contexts; and
    commencing execution of the running application(s).

7. The method of claim 1 further comprising:
    generating, at the at least one scan instrument, one or more signatures of the test data accumulated via the scan process, wherein the signatures are transmitted to the remote site.

8. The method of claim 1 wherein information scanned from the target is validated locally confirming desired system configuration or operation, by comparing against a remotely downloaded reference pattern.

9. The method of claim 1 wherein the plurality of fragments are processed at the at least one scan instrument to provide a unique signature representation of the scanned microcomputer element(s).

10. The method of claim 9 wherein the plurality of fragments are then transmitted to a remote location for comparison with a correct representation to confirm desired circuit configuration/operation.

11. The method of claim 9 wherein an expected reference pattern is transmitted from the remote location and compared locally to the test data or the signature to confirm desired circuit configuration/operation.

12. The method of claim 9 wherein the unique signature representation is then transmitted to a remote location for comparison with a correct representation to confirm desired circuit configuration/operation.

13. The method of claim 9 wherein the expected correct signature representation of extracted data fragments is transmitted from the remote location and compared locally to the unique signature to confirm desired circuit configuration/operation.

14. The method of claim 1 further comprising accessing a library of information regarding one or more circuit installations to obtain data or a test sequence to validate the circuit to be testing.

15. The method of claim 1 further comprising accessing a library of information regarding a multiplicity of circuit installations to obtain a correct validation signature for the circuit to be testing.

16. The method of claim 1 further comprising:
operatively connecting a multiplicity of scan instruments directly to the network; and
controlling the multiplicity of scan instruments over the network;
wherein the scan instruments have an additional interface that communicates with the diagnostic debug ports of a multiplicity of circuits to be validated.

17. The method of claim 1 further comprising:
operatively connecting a multiplicity of scan instruments directly to a local client computer, each by a dedicated port; and
controlling the multiplicity of scan instruments via the local client computer;
wherein one or more of the multiplicity of scan instruments each have an additional interface enabling communication with the diagnostic debug ports of a multiplicity of circuits to be validated.

18. The method of claim 1 wherein the at least one scan instrument includes a local client computer with a dedicated port connected to a multiplicity of other scan instruments via standard ports and operatively connected to the network to achieve communications visibility to the scan instruments over the network.

19. The method of claim 1 wherein the target to be validated comprises:
one or more circuits to be tested;
a microcomputer configured locally with the circuits; and
untrusted firmware and code patterns in the one or more circuits and readable by the microcomputer;
wherein the scan instrument is connected to a diagnostic debug port of the microcomputer to enable minimally disruptive firmware access while running.

20. The method of claim 19 further comprising extracting and validating one or both of firmware code and/or patterns from the one or more circuits containing untrusted firmware code and the code patterns, wherein the one or more circuits are configured without circuitry or commands for accommodating and/or participating in the extraction/validation, or relating to any other processing regarding the extraction/validation.

21. The method of claim 1 further comprising, in a system wherein the local microcomputer system includes a target CPU that transfers executable sectors from flash memory or other sources to RAM and wherein the sectors are characterized as having established states and remain wholly stable in the established states for the duration of the entire extraction sequence, spanning all incremental extraction steps in aggregate.

22. The method of claim 1 wherein the scan instrument is adapted to communicate with the target's microcomputer via a diagnostic debug port of non-chainable configuration.

23. The method of claim 1 wherein the scan instrument is adapted to communicate with a plurality of targets and associated circuit microcomputers within the targets via diagnostic debug ports that are connected as a chain to a single instrument test port.

24. The method of claim 23 wherein the scan instrument is configured to communicate with the target microcomputer(s) via diagnostic debug ports which comply substantially with the JTAG IEEE-1149.1, IEEE-1149.4, IEEE-1149.5, IEEE-1149.6, or IEEE-1149.7, or derived protocols, enabling external test operations of such microcomputer.

25. The method of claim 1 wherein the scan instrument is configured to communicate with a multiplicity of target microcomputers via diagnostic debug ports which comply with non-JTAG serial protocols, enabling external test operations of the microcomputers.

26. The method of claim 1 wherein one or more scan instruments are configured to support a mix of microcomputers within targets via chain-connected and/or non-chain-connected debug ports, where each instrument is separately connected to the network environment.

27. The method of claim 1 wherein the scan instrument is configured to:
operate a diagnostic debug port in the running target;
extract, via the diagnostic debug port, memory fragments stored within the target's circuitry;
command the microcomputer, when the running application(s) are momentarily halted, to return the memory fragments; and
command the microcomputer to continue execution of the running application(s);
wherein the memory fragments are extracted and collected without substantially altering normal sequencing of the microcomputer, except for during stopped time intervals when the running application(s) are momentarily halted.

28. The method of claim 27 wherein the memory fragments include program data and/or related code.

29. The method of claim 27 wherein the scan instrument is configured to transmit the collected code fragments to a remote server via the network.

30. The method of claim 27 wherein the scan instrument is configured to compare locally the collected code fragments to a remotely downloaded reference pattern.

31. The method of claim 27 wherein the scan instrument is configured to process/compute a signature representation code derived from such extracted collected firmware code according to a pre-defined algorithm, and conveying such signature to the remote server via the network.

32. The method of claim 27 wherein the scan instrument is configured to compare locally the generated signature to a remotely downloaded reference pattern.

33. The method of claim 1 further comprising managing the extraction/collection by a server at the remote site, including:
commencing an operation to extract test data including firmware; and
transmitting information associated with the firmware, including a representative signature of the extracted firmware, between the scan instrument and the server.

34. The method of claim 1 further comprising managing the extraction/collection by a server at the remote site, including:
commencing an operation to extract test data including firmware; and
performing a local validation of such data against its desired configuration or operation.

35. The method of claim 1 further comprising managing the scan instrument by a remote server including detecting a power state and/or status of connected circuits.

36. The method of claim 1 further comprising managing the scan instrument by a remote server including detecting whether attached circuits are installed in an operable installation, to effect a keep-alive status check, enabling the sensing of unauthorized attempts to disable or tamper with the circuits.

37. The method of claim 1 further comprising managing the scan instrument by a remote server including performing JTAG infra-structure scanning to detect the operable presence and/or installation status of subject circuits.

38. The method of claim 1 further comprising managing the scan instrument by a remote server including supporting common JTAG boundary scan functions applied to devices and circuits other than the diagnostic debug ports, wherein the devices or the circuits are wired in a connection chain of the local microcomputer system.

39. The method of claim 1 further comprising:
modifying the test data via inclusion of a random value or time-stamp pattern provided by a remote server;
computing a signature representation code derived from the modified test data; and
using a pre-defined algorithm to yield verifiable variation of resultant outcomes for each instance of the signature representation code.

40. The method of claim 39 wherein the test data includes extracted firmware code.

41. The method of claim 1 wherein at least portions of the scan process are provided by electronic components mounted with/located on the circuit being validated, within an assembly in which the circuit is located.

42. The method of claim 1 wherein at least portions of the scan process are provided by an electronic assembly mounted on or located with a client computer associated with the local microcomputer system, wherein the electronic assembly provides a communications link with a network environment and remote visibility of the scan instrument.

43. A scan instrument configured to validate memory content on a running target, comprising:
one or more interfaces configured for connection with one or more diagnostic debug ports of a local microcomputer system including the running target;
one or more components configured to perform a scan process distinct from a boundary scan process of at least one storage element associated with the running target through the one or more interfaces to obtain system data during operation of application(s) operating on the running target, the scan process including:
momentarily halting the application(s) operating on the running target; and
reading content related to the application(s) from the at least one storage element in the scan process distinct from a boundary scan process to obtain test data; and
transmitting the information, or its derived signature representation to a remote site;
wherein the transmitted information is validated to confirm desired system configuration or operation of the target.

44. The scan instrument of claim 43 wherein the at least one storage element includes a non-volatile storage device.

45. The scan instrument of claim 43 wherein the at least one storage element includes a volatile storage device.

46. The scan instrument of claim 43 wherein the scan process further includes accumulating information regarding the test data as a plurality of fragments extracted during the momentary halts.

47. The scan instrument of claim 43 wherein the scan instrument is configured to validate, via communication with the remote site, the information to confirm desired system configuration or operation of the target.

48. A system for validating memory content on a running target, comprising:
a scan instrument including:
one or more interfaces configured for connection with one or more diagnostic debug ports of a local microcomputer system including the running target;
one or more components configured to perform a scan process distinct from a boundary scan process of at least one storage element associated with the running target through the one or more interfaces to obtain system data during operation of application(s) operating on the running target, the scan process including:
momentarily halting the running application(s) operating on the running target; and
reading content related to the application(s) from the at least one storage element in the scan process distinct from a boundary scan process to obtain test data; and
transmitting the information or its derived signature representation to a remote location; and
a remote computing component coupled via a network to the scan instrument and configured to validate the information to confirm desired system configuration or operation of the target.

49. The system of claim 48 wherein the at least one storage element includes a non-volatile storage device.

50. The system of claim 48 wherein the at least one storage element includes a volatile storage device.

51. The system of claim 48 wherein the scan process further includes accumulating information regarding the test data as a plurality of fragments extracted during the momentary halts.

52. A method of validating memory content on a running target, comprising:
associating at least one scan instrument with one or more diagnostic debug ports of a local microcomputer system including the running target;
performing a scan process distinct from a boundary scan, via the at least one scan instrument, via access of at least one storage element associated with the running target through the one or more diagnostic debug ports to obtain system data during operation of application(s) operating on the running target, the scan process including:
momentarily halting the application(s) operating on the running target; and
reading content related to the application(s) from the at least one storage element in the scan process distinct from a boundary scan process to obtain test data;

transmitting information regarding an expected reference pattern relating to the test data from a remote location to the local microcomputer system; and comparing the information locally to the test data to confirm desired circuit configuration and/or operation.

53. The method of claim 52 further comprising:

generating, at the at least one scan instrument, one or more signatures of the test data accumulated via the scan process, wherein the signatures are compared to the information transmitted from the remote location, wherein the information transmitted from the remote location comprises signatures corresponding to the expected reference pattern or the test data.

\* \* \* \* \*